(12) United States Patent
Pakker

(10) Patent No.: US 6,540,266 B2
(45) Date of Patent: Apr. 1, 2003

(54) SPIN FORMING A TUBULAR WORKPIECE TO FORM A RADIAL FLANGE ON A TUBULAR FLANGE AND A THICK RIM ON THE RADIAL FLANGE

(75) Inventor: Ulrich Pakker, Seattle, WA (US)

(73) Assignee: MacDonald-Miller Inc., Seattle, WA (US)

( * ) Notice: Subject to any disclaimer, the term of this patent is extended or adjusted under 35 U.S.C. 154(b) by 0 days.

(21) Appl. No.: 09/847,258

(22) Filed: May 2, 2001

(65) Prior Publication Data

US 2002/0125722 A1 Sep. 12, 2002

Related U.S. Application Data

(63) Continuation-in-part of application No. 09/800,277, filed on Mar. 6, 2001.
(60) Provisional application No. 60/212,399, filed on Jun. 19, 2000.

(51) Int. Cl.[7] .............................. F16L 23/04; F16L 23/12
(52) U.S. Cl. ...................... 285/424; 285/405; 285/363; 285/368
(58) Field of Search ................................ 285/405, 363, 285/368, 424, 412

(56) References Cited

U.S. PATENT DOCUMENTS

| | | | | | |
|---|---|---|---|---|---|
| 682,026 | A | * | 9/1901 | Bungeroth | 285/412 |
| 1,450,826 | A | * | 4/1923 | Walton | 138/159 |
| 3,199,901 | A | * | 8/1965 | Jeppsson | 285/364 |
| 3,428,342 | A | * | 2/1969 | Chambers | 285/399 |
| 4,046,409 | A | * | 9/1977 | Virgin | 285/305 |
| 4,244,609 | A | * | 1/1981 | Smitka | 285/405 |
| 4,288,115 | A | * | 9/1981 | Sullivan | 285/363 |
| 4,328,981 | A | * | 5/1982 | Greene et al. | 285/288.1 |
| 4,881,762 | A | * | 11/1989 | Arnoldt | 285/367 |
| 5,129,690 | A | * | 7/1992 | Meinig et al. | 285/363 |
| 6,412,519 | B1 | * | 7/2002 | Goodhue | 138/109 |

FOREIGN PATENT DOCUMENTS

DE          4308013      *  9/1994   ................. 285/424

* cited by examiner

*Primary Examiner*—Eric K. Nicholson
(74) *Attorney, Agent, or Firm*—Delbert J. Barnard

(57) ABSTRACT

A cylindrical workpiece (20) is mounted onto and connected to a mandrel (14) that is itself mounted for rotation about a vertical axis (12). A first end portion of the workpiece (20) is housed within the mandrel (14). A second end portion-projects axially outwardly beyond a radial forming surface (60) on the mandrel (14). A first forming roller (30) is mounted on a swing post (52) that is positioned by an adjustable length strut (56). The strut (56) is elongated to swing the post (52) downwardly and place the roller (30) inside the second end portion of-the workpiece (20). Then, a lead screw (28) is used for pulling on a base (50) that supports the post (52). This pulls a convex face portion (32) of the roller (30) against the inside of the second end portion of the workpiece (20). Lead screw operation moves the roller (30), causing it to stretch the second end portion of the workpiece (20) and move it up onto and then move it radially outwardly along the forming surface (60). The movement of the roller (30) can be stopped before the roller (30) passes the outer diameter of the forming surface (60). Then, the outer end part of the workpiece is bent radially inwardly and then flat against an adjoining portion of the workpiece (20) that is in contact with the forming surface (60).

6 Claims, 9 Drawing Sheets

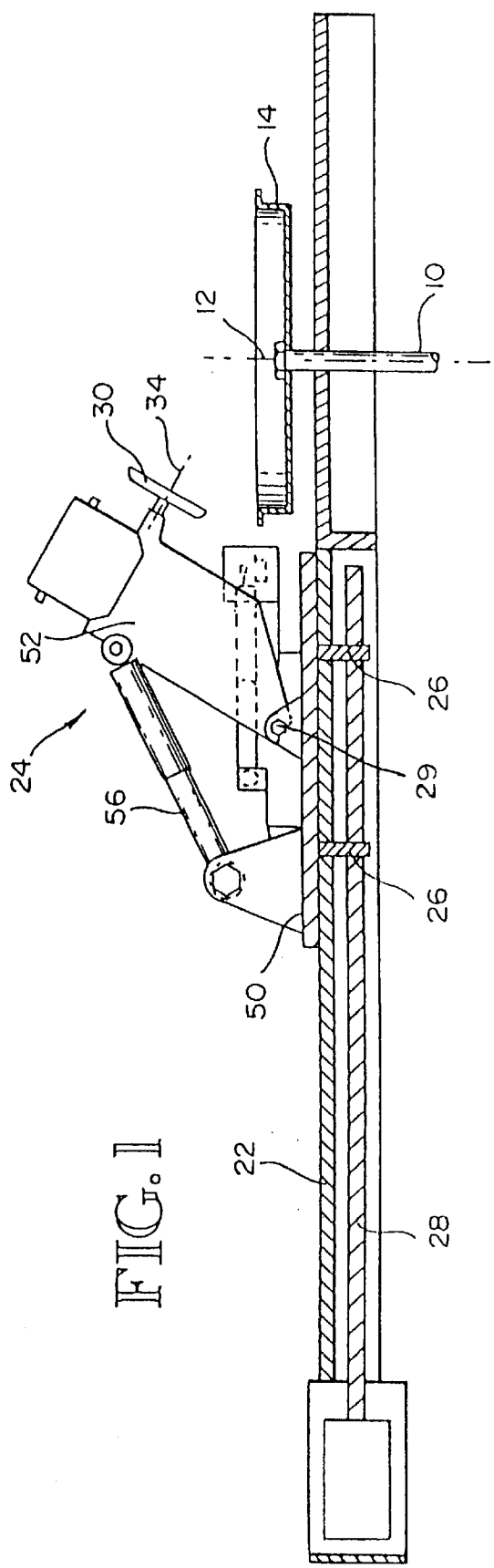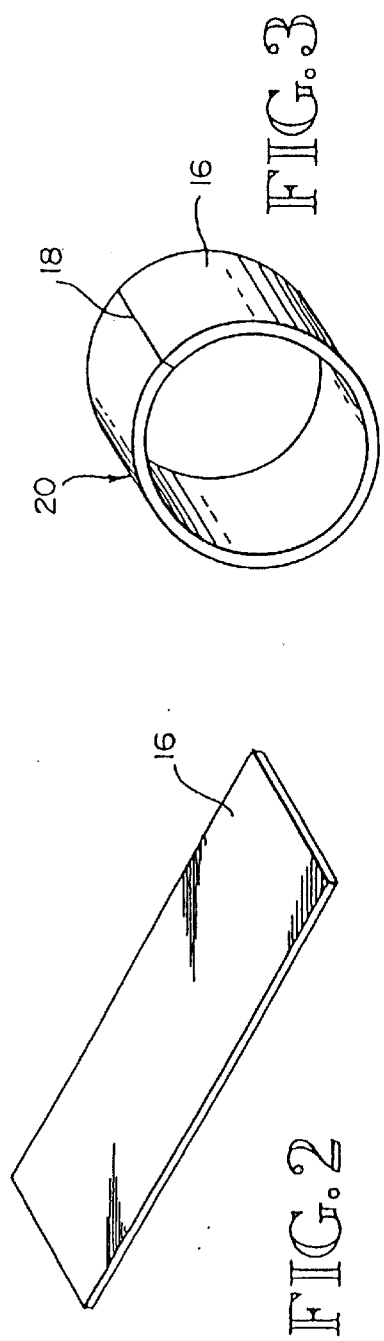

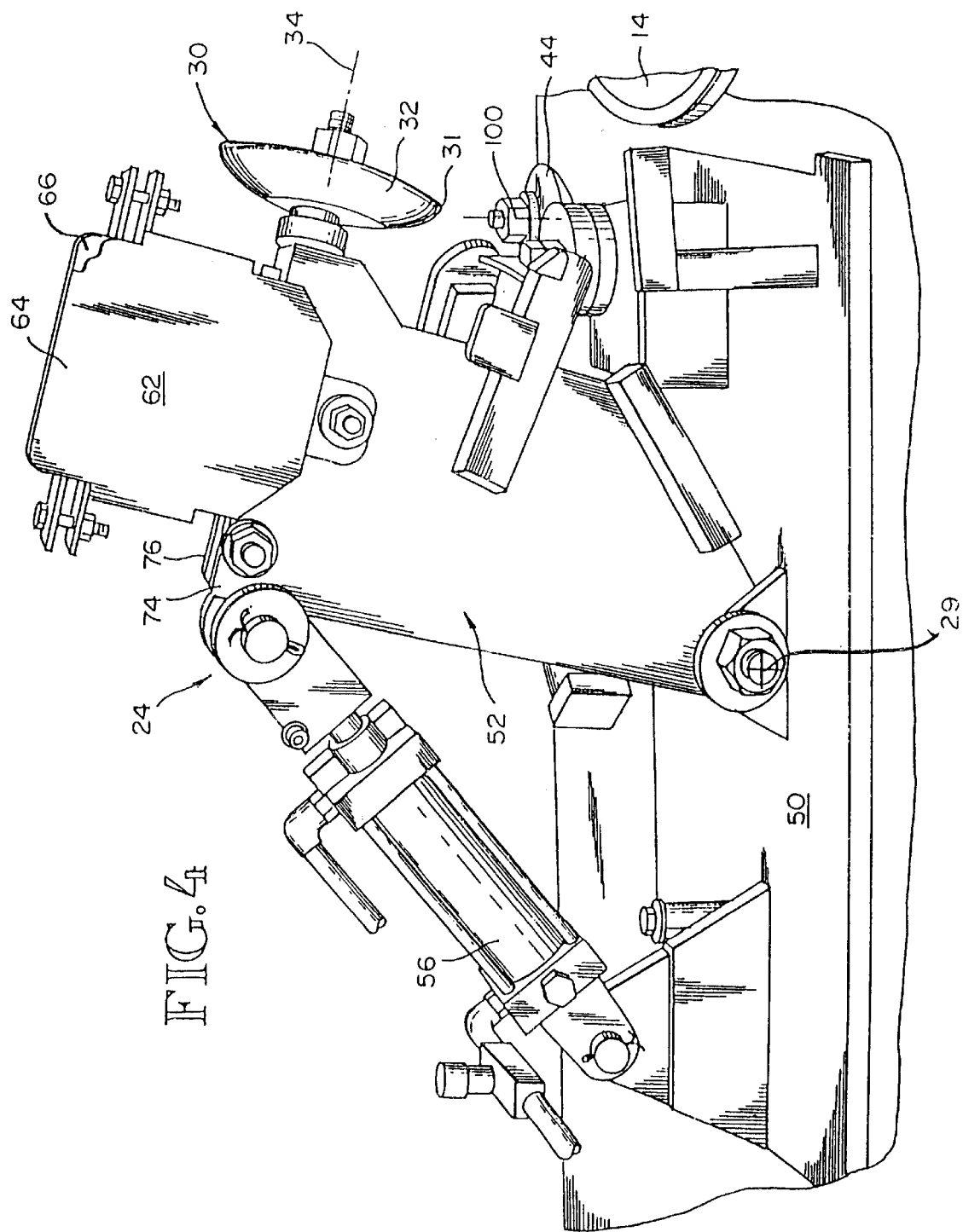

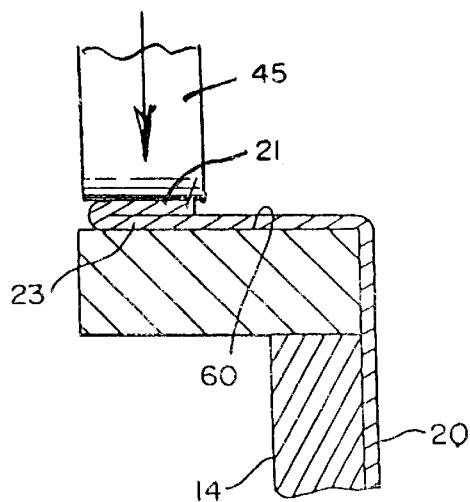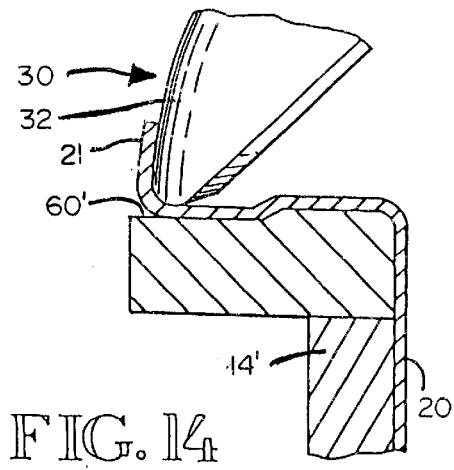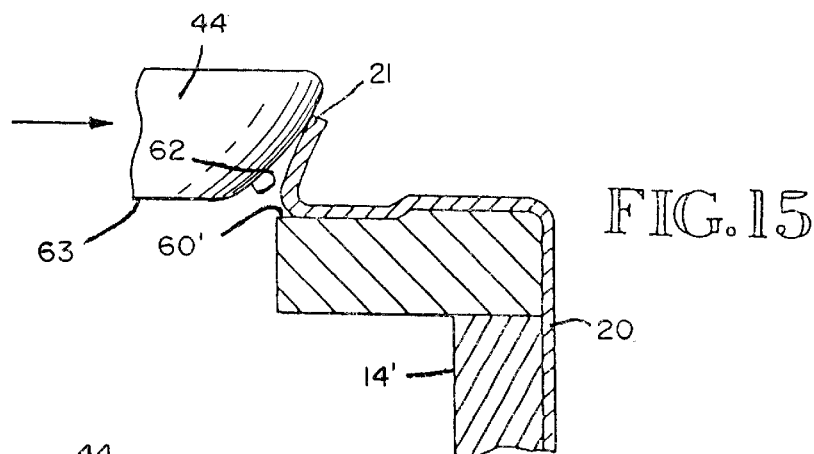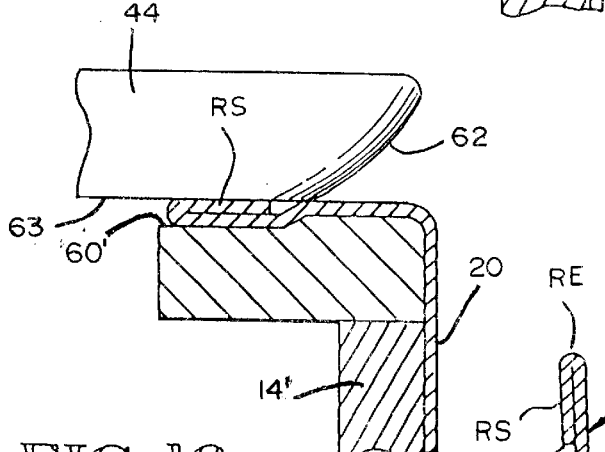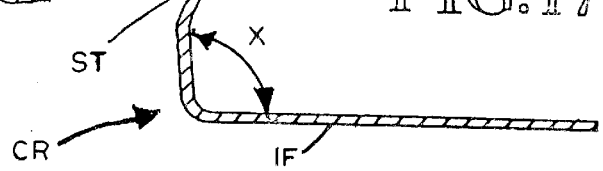
FIG. 13
FIG. 14
FIG. 15
FIG. 16
FIG. 17

SMACNA T-23

SMACNA T-23

SPIN FORMING A TUBULAR WORKPIECE TO FORM A RADIAL FLANGE ON A TUBULAR FLANGE AND A THICK RIM ON THE RADIAL FLANGE

RELATED APPLICATION

This application is a continuation-in-part of my co-pending application, Ser. No. 09/800,277 filed Mar. 6, 2001, and entitled "Spin Forming A Tubular Workpiece To Form A Radial Flange On A Tubular Flange And A Bead Oryhick Rim On The Radial Flange"which claims priority to provisional application Ser. No. 60/212,399, filed June 19, 2000, and entitled "Spin Forming An End Portion Of A Tube To Form A Radial Flange On A Tubular Flange And A Bead On The Radial Flange."

TECHNICAL FIELD

This invention relates to a method and product aspects of spin forming an end portion of a cylindrical sheet metal workpiece to form a radial flange section and a double-thickness rim at the periphery of the radial flange section.

BACKGROUND OF THE INVENTION

At least as early as the 1980's Spiral Fittings, Inc., presently located in Andrews, S.C., has spun formed cylindrical workpieces to make connector rings for cylindrical HVAC ducting. The Spiral Fittings' connector ring is formed by spin forming a cylindrical workpiece to provide a radial flange at one of its ends. The radial flange becomes what is known as a "mating flange" and the unworked portion of the workpiece becomes what is known as an "insertion flange." This structure is used as a connector ring at one end of a section of HVAC ducting. The insertion flanges of two such connector rings are inserted into end portions of two sections of ducting that are to be connected together. Sheet metal screws or the like are used to connect the end portions of the sections of ducting to the insertion flanges of two connector rings. Then, the two sections of ducting are put into axial alignment with their mating flanges moved almost together. An annular seal is placed between the two mating flanges and nuts and bolts are used to connect the mating flanges together with the sealing ring held between them. A disadvantage of the Spiral Fittings' connector ring is that the mating flanges are relatively flexible and have sharp edges at their outer peripheries.

It is known to provide connector rings for oval ducts with mating flanges having outer peripheries that are in various ways made to be blunt instead of sharp. Example connector member profiles are disclosed by U.S. Pat. No. 5,129,690, granted Jul. 14, 1992 to Manfred Meinig, Peter J. Arnoldt and Fredrick J. Arnoldt. The SMACNA HVAC Duct Construction Standards include several types of standard connector profiles for HVAC ducting. One of these profiles is the T-23 profile which has a double-thick radial flange. Another standard profile is the T-24 profile. It has a cylindrical return hem section at the periphery of the radial flange.

U.S. Pat. No. 5,983,496 granted Nov. 16, 1999 to Jeffrey Allen Hermanson discloses spin forming a cylindrical sheet metal workpiece to make a connector ring for HVAC ducting. Like Spiral Fittings, Inc., Hermanson spin forms a cylindrical workpiece to form a radial flange at one end of the workpiece. The unaltered portion of the workpiece becomes an insertion flange and the radial flange becomes a mating flange. Whereas Spiral Fittings, Inc. leaves a sharp edge at the periphery of its mating flange, Hermanson continues the spin forming operation to form a cylindrical return hem section at the periphery of the mating flange and give the connector ring a standard SMACNA T24 profile.

The method of the present invention also continues the spin forming process but uses different action steps and tooling to form a modified T-23 profile at the periphery of the mating flange in place of Hermansonas cylindrical, T-24 return hem section.

BRIEF SUMMARY OF THE INVENTION

The invention includes an improved method of spin forming a cylindrical sheet metal workpiece, to form a sheet metal connector ring or sheet metal ducting. A mandrel is used that has an open center, a generally radial forming surface surrounding the open center, and an outer diameter. A first end portion of the workpiece is positioned in the open center of the mandrel and is secured to the mandrel. A second end portion of the workpiece projects axially outwardly from the center opening in the mandrel and has an outer end part. The mandrel and the workpiece are spun together about a common spin axis and during spinning the second end portion of the workpiece is progressively stretched in diameter and moved radially outwardly on to and along the generally radial forming surface of the mandrel. The mandrel and workpiece are rotated and a first forming tool is used to stretch the second end portion of the workpiece and move it radially outwardly, on the radial forming surface. This is done at least until the outer end part of the second end portion of the workpiece becomes spaced generally axially from the radial forming surface substantially at the outer diameter of the mandrel. Accordingly to one aspect of the invention, the rotation of the mandrel and workpiece is continued and a second forming tool is moved against the outer end part of the second end portion of the workpiece. This second forming tool is used to fold the outer end part radially inwardly and move it substantially against an adjoining radial part of the second end portion of the workpiece that is in contact with the radial forming surface on the mandrel. Preferably, a forming tool is used to press the outer end part of the second end portion of the workpiece flat against the adjoining radial part of the second end portion of the workpiece. Following these forming steps, the formed workpiece is removed from the mandrel to become a connector ring that has a radial flange at a first end and a cylindrical flange at a second end, wherein the radial flange has an outer marginal portion with a rounded outer edge.

The method includes providing a first forming tool that includes a roller having a center axis. The roller is mounted for free rotation about the center axis. The roller is provided with a convex face. The roller is positioned inside the second end portion of the workpiece, with its convex face directed towards the second end portion of the workpiece. The roller is then moved along a path that is within a plane that includes the spin axis of the mandrel and the center axis of the roller. As it moves, the roller progressively stretches the second end portion of the workpiece and progressively forces it against the generally radial forming surface of the mandrel.

The invention further includes providing a support arm for the first forming tool. The support arm is pivotally connected at a lower end to a support frame, for pivotal movement about a pivot axis that extends perpendicular to the center axis of the roller. The roller is mounted onto the support arm at a location spaced from the pivot axis. The support arm is swung about the pivot axis to place the roller inside of the second end portion of the workpiece, in position to contact the second end portion of the workpiece and stretch it and force it against the radial forming surface of the mandrel as the roller is being moved. In preferred form, the mandrel is mounted to rotate about a spin axis that extends substantially vertically. As a result, the generally radial forming surface is in a plane that extends substantially horizontally.

The invention includes mounting the first forming tool for movement towards and away from the generally radial forming surface of the mandrel, and spring biasing the roller towards the radial forming surface. As a result, when the first forming roller is moved to stretch the second end portion of the workpiece and force it against the generally radial forming surface of the mandrel, the first forming roller will be urged by its contact with the workpiece and caused to move upwardly against its bias so as to provide space between its periphery and the radial forming surface of the mandrel for the workpiece material that is being moved radially outwardly in contact with the radial forming surface of the mandrel.

The present invention also includes providing a second forming tool that includes a roller that has a center axis and a cam surface that surrounds the center axis. The second forming tool is moved radially to place its cam surface against the outer part of the second end portion of the workpiece. It is further moved to cause the cam surface to cam the outer part of the second end portion of the workpiece both radially inwardly and axially towards an adjoining radial part of the second end portion of the workpiece that is in contact with the radial forming surface on the mandrel.

A third forming tool may be provided for pushing down on the folded back portion of the mating flange, so as to push it tight against the adjoining portion of the mating flange that is below it.

The present invention includes providing a connector ring having a cylindrical insertion flange sized to be received within an end portion of a section of sheet metal ducting. It also includes a radial mating flange extending radially outwardly from one end of the insertion flange to an outer edge. The mating flange has an annular, single-thickness, inner portion and an annular, double-thickness, outer portion. The inner portion extends radially outwardly from one end of the insertion flange and then makes a jog. One thickness of the outer portions extends radially outwardly from the jog. The other thickness of the outer portion extends radially inwardly along one side of the first thickness, substantially coplanar with the inner portion of the mating flange. The double-thickness outer portion has a laterally rounded outer edge and an inner edge that is spaced radially inwardly from the outer edge on the side of the mating flange that is opposite the insertion flange. The inner edge forms an inner boundary for the double-thickness, outer portion of the mating flange.

The present invention further includes providing a connection between adjoining ends of two duct sections. Two sheet metal connector rings of the type described above are provided, one for each duct section. The cylindrical insertion flange of each connector ring is telescopically received in the end portion of its section of sheet metal ducting. The radial mating flanges of the two connector rings confront each other with their double-thickness outer portions confronting each other. An axial space is formed between the mating flanges. A seal ring is situated in the space, contacting the mating flanges. Fasteners (e.g. sheet metal screws) connect the end portions of the duct sections to the insertion flanges of the connector rings. Fasteners (e.g. sheet metal screws) connect the mating flanges of the two connector rings together.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and:

FIG. 1 is a side elevational view of forming equipment constructed in accordance with the invention and adapted for making a connector ring that includes a double-thickness outer portion of the mating flange;

FIG. 2 is a pictorial view of a strip of sheet metal that is used to form a cylindrical workpiece;

FIG. 3 is a pictorial view of the strip of sheet metal after it has been rolled into a cylindrical shape and its ends have been welded together where they meet, so as to form a cylindrical workpiece;

FIG. 4 is an enlarged scale side view of a central portion of FIG. 1, showing more detail than is shown in FIG. 1;

FIG. 13 is a view like FIG. 11, but showing the second forming tool removed and a third forming tool being moved downwardly against the folded over portion of the mating flange, for pushing it into tight contact with the adjoining portion of the mating flange;

FIG. 14 is a view like FIG. 9, but showing an offset formed in the radial forming surface of the mandrel;

FIG. 15 is a view like FIG. 10, but showing the mandrel construction of FIG. 14;

FIG. 16 is a view like FIG. 11, but showing the mandrel construction of FIGS. 14 and 15;

FIG. 17 is a view like FIG. 12, but showing the double-thickness region of the mating flange offset towards the insertions flange side of the connector ring;

DETAILED DESCRIPTION OF THE INVENTION

Figure 5:
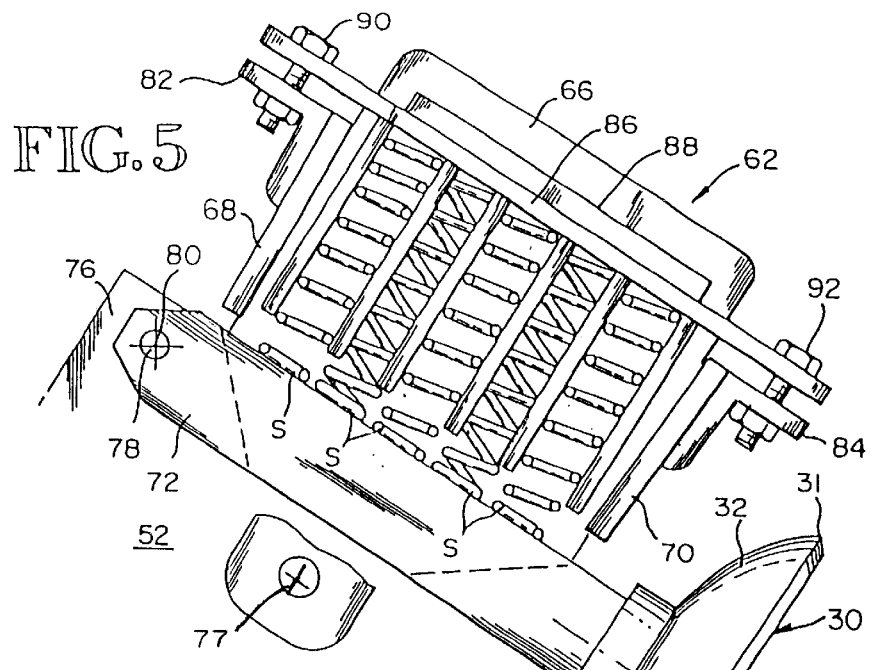
FIG. 5 is a fragmentary view of the upper portion of FIG. 4, with a foreground cheek plate removed from a housing that is on top of a support arm, such view showing springs inside the housing which press against and bias downwardly a support arm on which a first forming roller is mounted for free rotation about a center axis, and showing the periphery of the forming roller at a level below the level of the radial forming surface on the mandrel, and showing a convex face on the forming roller contacting the inner surface of the second end portion of the workpiece.

A spindle 10 is suitably mounted for rotation about a vertical axis 12 (FIG. 1). A spin die or mandrel 14 is mounted onto the spindle 10 such that rotation of the spindle 10 will cause a be rotation of the mandrel 14 about the vertical axis 12. The mandrel 14 is provided that has a bottom wall and a cylindrical sidewall talc connected to and projecting upwardly from the periphery of the bottom wall.

A sheet metal sheet is cut into narrow rectangular strips 16 (FIG. 2). The strips 16 are each rolled into a cylindrical shape. The abutting ends of each rolled strip are welded together at 18 to form a continuous, cylindrical sheet metal ring 20 (FIG. 3). This method of forming a cylindrical workpiece is per se old. It is a well-established practice.

A lower end portion of a sheet metal ring 20 is set down into the mandrel 14 and is secured to the mandrel 14 in any suitable manner such as by clamps as disclosed in the aforementioned U.S. Pat. No. 5,983,496. When the sheet metal ring 20 is secured to the mandrel 14, an upper end portion of the ring 20 projects upwardly above the mandrel 14 (FIG. 5). A table 22 extends laterally from the mandrel 14 (FIG. 1). A track is formed in the table 22 and extends outwardly from the mandrel 14. A tool support 24 is mounted on the table 22 and is guided by the track for movement towards and away from the mandrel 14. The tool support,24 includes lead screw nuts 26 that are within the track, each includes a threaded lead screw opening. A lead screw 28 in the track extends through the threaded openings. It has an axis coinciding with the axis of the track and the lead screw opening. Rotation of the lead screw 28 in one direction moves the tool support 24 towards the mandrel 14. Rotation of the lead screw 26 in the opposite direction moves the tool support 24 away from the mandrel 14.

A roller tool 30 is mounted on the tool support 52 and is swingable about an axis 29 between a raised position and a lowered position. When it is in its raised position (FIG. 1), roller tool 30 is above the sheet metal ring 16 (FIG. 1). When it is in its down position, it is inside of the sheet metal ring 16 and its periphery 32 is radially inside of the sheet metal ring 16 (FIG. 5). The roller tool 30 is also mounted on the tool support 24 for free or passive rotation about its axis 34.

A motor (not shown) is provided to rotate the spindle 10, the mandrel 14 and the sheet metal ring 20. The tool support 24 and the roller tool 30 are moved to position the roller tool 30 inside the sheet metal ring 20, with its periphery 32 inwardly of the upper end portion of the sheet metal ring 20 (FIG. 4). The lead screw 28 is rotated to cause movement of the tool support 24 radially inwardly and radially outwardly. Radial outward movement moves the periphery 32 of the roller tool 30 towards the upper end portion of the sheet metal ring 20. Lead screw rotation is continued in the same direction. This moves the periphery 32 of the roller tool 30 against the sheet metal ring 20, above the mandrel 14, and causes the sheet metal ring 20 to stretch outwardly (FIG. 6).

Referring back to FIG. 1, the tool support 24 includes a base 50. The lead screw nuts 26 depend from the base 50 into the track which may be a slot in the table 22. A post 52 projects upwardly from the base 50. The lower end of post 52 is connected to the base 50 for pivotal movement about a horizontal axis 54. An adjustable length strut 56 is interconnected between an upper portion of the post 52 and a rearward portion of the base 50. Extension of the strut 56 swings the post 52 forwardly and downwardly and moves the roller tool 30 downwardly. Retraction of the strut 56 swings the post 52 rearwardly and upwardly and moves the roller tool 30 upwardly. Adjustable strut 56 may be a double acting hydraulic cylinder.

Figure 6:
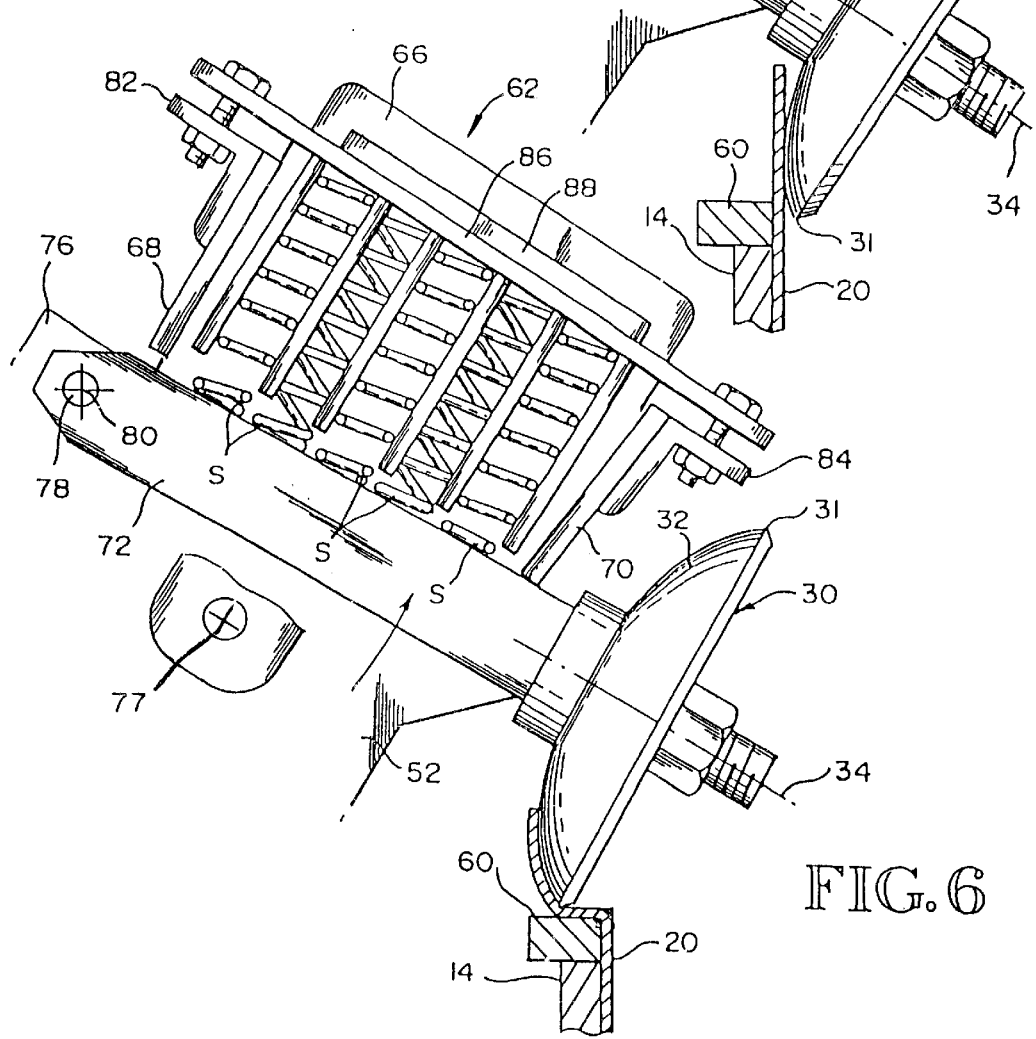
FIG. 6 is a view like FIG. 5, but showing the support member and the forming roller moved to the left, and further showing that the forming roller-has been moved upwardly against the force of the springs, so that the workpiece metal can lie down on the radial forming surface of the mandrel, between such surface and the periphery of the forming roller.

As best shown by FIGS. 5 and 6, the upper portion of post 52 includes a spring housing 62 formed by a pair of side plates 64, 66 and end plates 68, 70. An elongated mounting bar 72 is, located between two lower side plates 74, ,76. A bolt or some other suitable pivot pin 77 mounts the lower ends of the side plates 64, 66 to the side plates 74, 76. A bolt or some other suitable pivot pin 78 mounts one end of support bar 72 for pivotal movement about a transverse axis 80. Sections of angle iron 82, 84 are secured to the end plates 68, 70. Specifically, generally vertical legs of the angle irons 82, 84 are connected to the end plates 68, 70 and generally horizontal legs project laterally outwardly from the end plates 68, 70. A top plate 86, stiffened by a longitudinal bar 88 on its topside, provides a removal top for the housing 62. A plurality of springs S are positioned within the housing 62. The lower ends of the springs S rest on the mounting bar 72. The upper ends of the springs S contact the top plate 86. Nut and bolt assemblies 90, 92 adjustably secure the top plate 86 to the angle iron members 82, 84. The springs S are placed within the housing 62, with their lower ends touching the mounting bar 72. Then the top plate 86 is installed and the bolts 90, 92 are tightened to the extent necessary to apply a downwardly biasing force on the mounting bar 72. Roller 30 is mounted on the mounting bar 52 for free rotation about a center axis.

As shown in FIG. 5, the roller 30 has a start position in which its periphery 31 is at a level below the level of forming surface 60. In order for the assembly shown in FIG. 5 to move from its FIG. 5 position over to its FIG. 6 position, the roller 30 must ride up on the sheet metal workpiece 20 so that the upwardly projecting end portion of the workpiece 20 will bend over on to surface 60 and be movable by the periphery 31 of roller 30 outwardly on the surface 60 in response to the outward movement of roller 30.

Starting with FIG. 5, with the periphery 31 of the roller 30 at a level below the level of forming surface 90, the lead screw 28 is operated to move the frame 50 and the various elements 52, 30 mounted on it to the left as illustrated in FIG. 1. The corner formed between the inner surface of the workpiece 14 and the forming surface 60 becomes a speed bump over which the roller 30 must travel. The convex surface 32 on the roller 30 functions to stretch the projecting end portion of the workpiece 20 and start it moving up and over onto the surface 60. As the roller 30 moves to the left, as pictured, it rises up onto the workpiece as the workpiece is moving up onto the surface 60. At the same time, the mounting arm 72 for the roller 30 swings upwardly against the force of the springs S, storing energy in the springs S.

The springs S are herein shown in the form of coil springs. The number, size, placement and stiffness of the springs may vary. Also, gas springs (or spring) may be used in place of the coil springs S. Also, a solid block elastomeric spring (or springs) may to be used. All that is necessary is a member that will compress and store energy when compressed. In the illustrated embodiment, the bolts 90, 92 serve as a way of adjusting the stored energy in and initial position of the springs S, in addition to securing the cover plate 86 to the mounting brackets 82, 84. Slight adjustments can be made in the above-described equipment and procedures for making slight changes in the shape of the edging on the radial flange.

Figure 9:
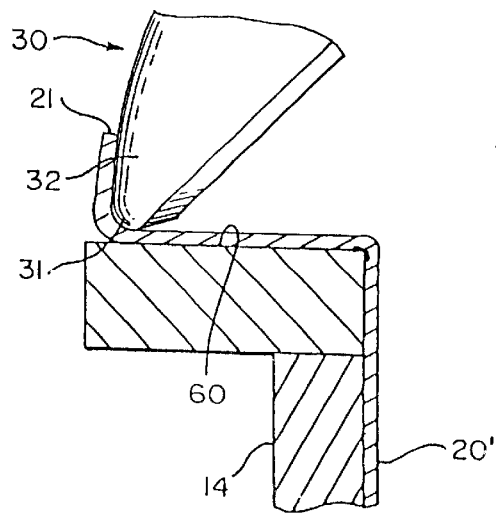
FIG. 9 is a fragmentary sectional view of a portion of the cylindrical workpiece that has been locked to the mandrel shown in FIG. 1, such view also showing a lower portion of a roller tool that is used in the spinning method, and showing the roller tool being moved against the projecting portion of the cylindrical workpiece, and in the process of stretching it both radially and circumferentially.
Figure 10:
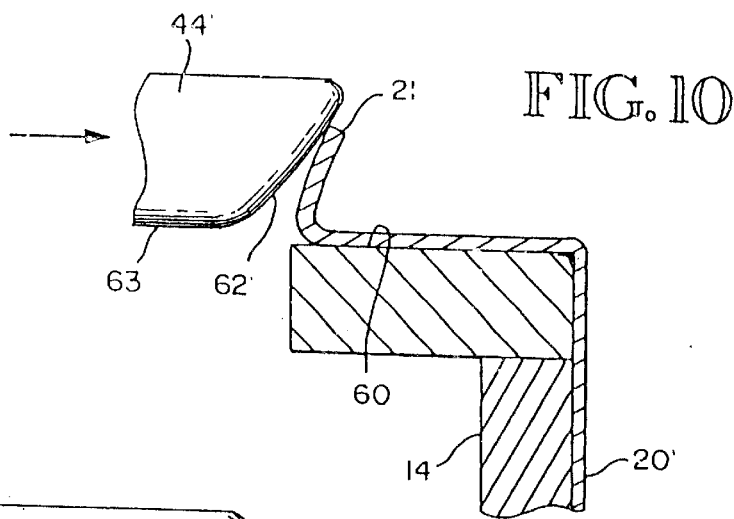
FIG. 10 is a view like FIG. 9, but showing the first forming roller removed and a second forming roller and cam being used to bend the outer part of the second end portion of the workpiece radially inwardly.
Figure 11:
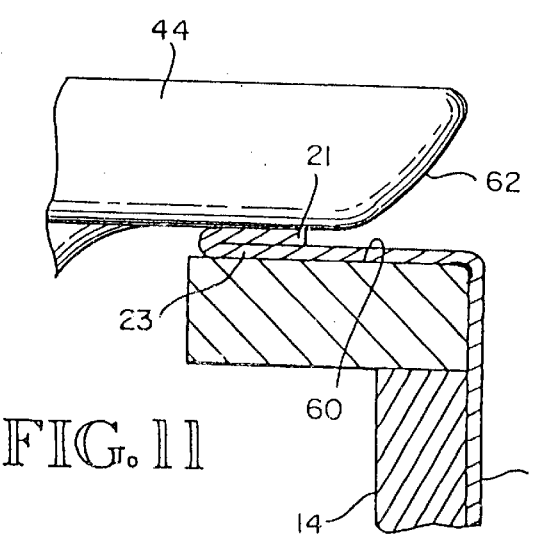
FIG. 11 is a view like FIG. 10, but showing the second forming roller and cam moved further to the right so as to at least partially flatten the outer end part of the second end portion of the workpiece down onto and against the adjoining radial portion of the flange that is being formed.

FIGS. 5, 6 and 9 show the progression of movement of the roller 30 against the projecting portion of the workpiece 20, and the projecting portion of the workpiece 20 against the surface 60, throughout the radial travel of the roller 30 from its start position (FIG. 5) out to an end position in which its periphery 31 is substantially in the position shown by FIG. 9. In this position, the outer end part 21 of the projecting portion of the workpiece 20' is substantially at the outer diameter of the forming surface 60. It is also still against the convex surface 32 and thus it projects generally axially outwardly from the surface 60. After this position is reached, the forming roller 30 is removed from contact with the workpiece and back out of the way. Then, a second roller 44 is moved radially against the outer end part 21 of the workpiece 20, while the mandrel 14 and workpiece 20 are still spinning. Forming roller 44 is moved radially inwardly so as to cause its cam surface 62 to curl the end part 21 of workpiece 20 radially inwardly and then move it down substantially against the adjoining radial portion 23 of the workpiece 20 that is against and has assumed the shape of the surface 60, as shown by FIG. 11.

Figure 7:
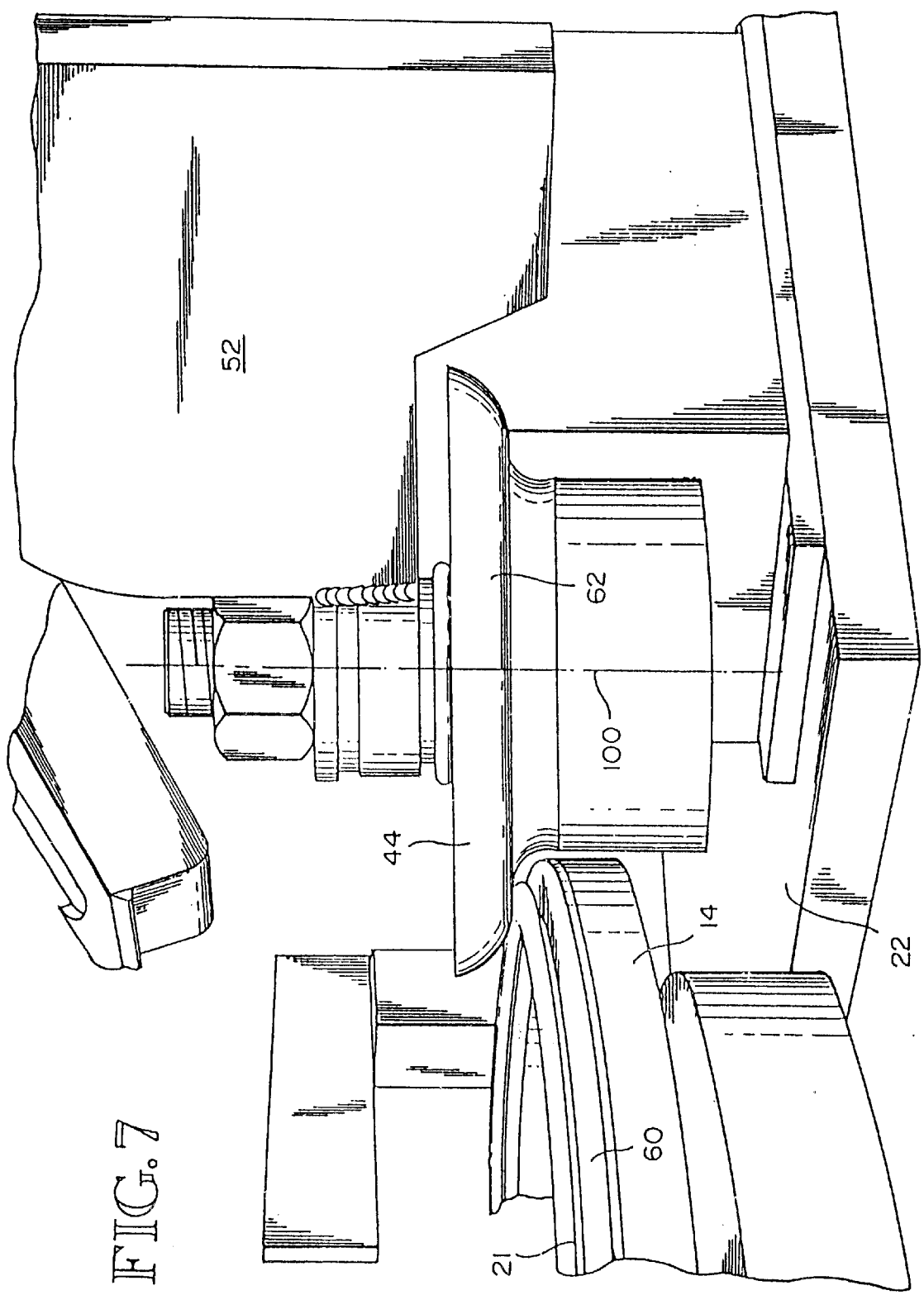
FIG. 7 is a fragmentary pictorial view showing the second roller tool and cam forming the function depicted in FIG. 22.
Figure 8:
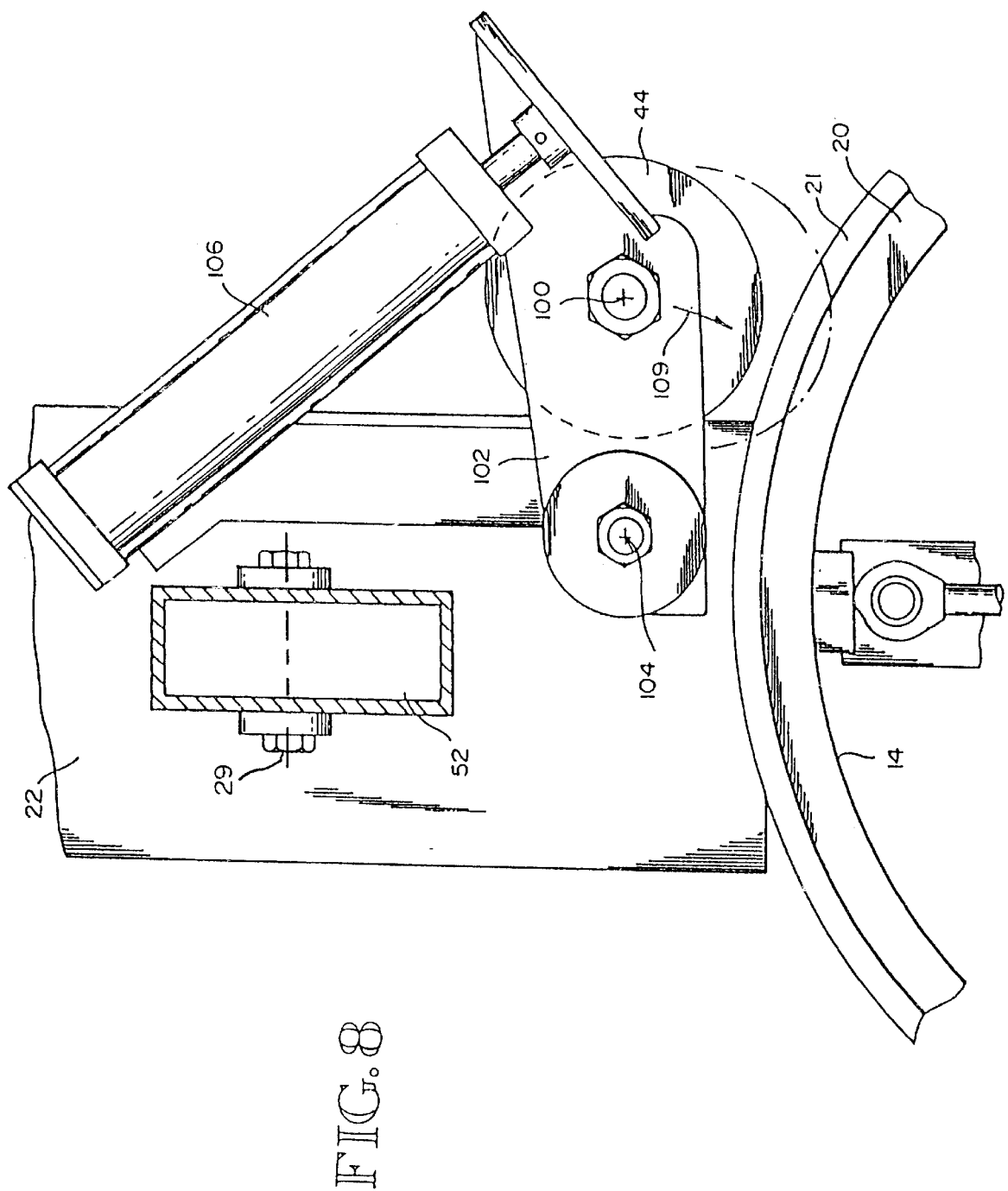
FIG. 8 is a fragmentary top plan view, looking down on the second forming roller and cam and the assembly of which it is apart, such view including a solid line drawing of the forming roller and cam retracted from the mandrel and workpiece and a broken line showing of the forming roller and cam positioned in the position shown by FIGS. 22 and 23.

Referring to FIGS. 7 and 8, the roller 44 is mounted for free rotation about an axis 100. By way of example, it may be mounted on to a swing arm 102. The swing arm 102 is then mounted for rotation about a swing axis 104 (FIG. 8). Swing arm 102 is mounted onto a frame 50 (FIG. 4). A linear actuator 106 may be connected to an outer end portion of the arm 102. FIG. 24 shows the actuator 106 retracted and the arm 102 and forming roller 44 moved back away from the mandrel 14 and the workpiece 20. FIG. 24 also includes a broken line showing of the position of forming roller 44 when the actuator 106 is extended. Extension of the actuator 106 swings the arm 102 in the direction of arrow 104, moving with it the roller 44.

Referring to FIG. 13, after the cam 44 is used, an additional cam 45 may be used for pushing the end portion 21 of the mating flange down onto the adjoining portion 23 of the mating flange. Cam 45 may be a roller at one end of a lever that has a handle at its opposite end and a fulcrum between its end under which the lever passes. A lifting of the handle of the lever will move the lever upwardly against the fulcrum and swing its end portion 45 down against the end portion 21 of the mating flange. Of course, for this operation, any sort of tool can be used that is adapted to exert a downward force on the end portion 28 of the mating flange.

Figure 12:
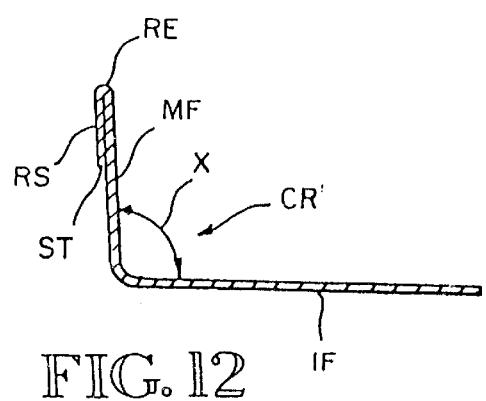
FIG. 12 is a sectional view of the formed connector ring showing a double-thick flat edge at the outer periphery of the mating flange.
Figure 20:
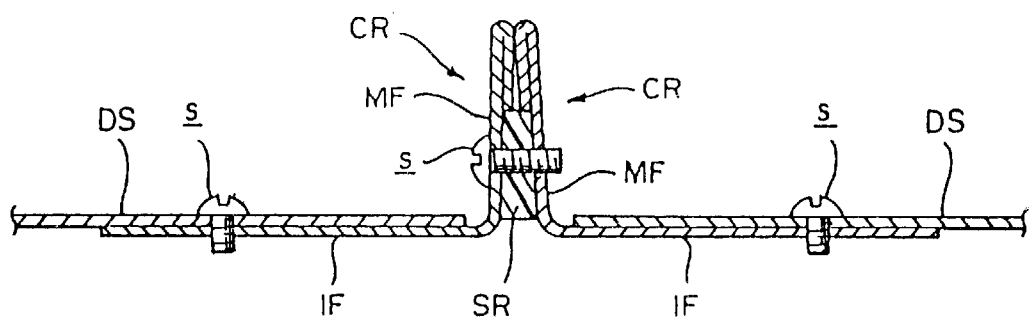
FIG. 20 is a fragmentary sectional view of a joint formed by two connector rings that are connected together by sheet metal screws or bolts extending through the two mating flanges, showing a joint formed by the use of connector flanges having the profile shown by FIG. 12.

FIG. 12 shows the connector ring CR that is formed by the just described method. This connector ring CR has a tubular insertion flange IF and a radial mating flange MF. This mating flange MF includes a rim strip RS that extends radially substantially against the radial body of mating flange MF. It also includes a rounded edge RE. The rim strip RS provides the mating flange MF with an annular double-thickness portion at its outer periphery, and with a rounded outer edge RE. It also provides an inner edge SS on strip RS that functions as a seal stop SI. FIG. 20 shows a connection formed by two connector rings CR between which has been inserted a seal ring SR. Seal ring SR may be formed in situ by applying an annular bead of a sealing material against the surface of the mating flange MF immediately inwardly of the edge ST. Or, the seal ring SR may be a preformed ring or may be made of strip material that is set in place against the surface of the mating flange MF radially inwardly of the edge ST.

As shown by FIG. 20, when the two connector rings CR are brought together, the rim strips RS contact, providing a space inwardly of the two edges ST in which the seal ring SR may be received. The insertion flanges IF of the connector rings CR are inserted into the tubular end portions of the duct sections DS and sheet metal screws S are used to connect the duct sections DS to the insertion flanges IF. Also, sheet metal screws S are used to connect the two mounting flanges MF together. As these sheet metal screws S are fastened, they draw together the portions of the mating flanges MF that are inwardly of the contacting rim strips RS. There may be some movement of the sheet metal, causing some stressing of the threads of the sheet metal screws S. This functions to help stiffen the connector rings CR and the joint that they form.

Referring to FIGS. 12 and 20, the angle between mating flange MF and insertion flange IF may be substantially about ninety degrees or may be a little more than ninety degrees (e.g. about 91–93 degrees) so that the mating flanges MF will lean towards each other somewhat at the joint. This builds some spring energy in the mating flanges MF. When the mating flange screws S are tightened, they will tend to move the mating flanges MF into perpendicular positions with the insertion flanges. Any movement of the mating flanges MF will serve to strengthen the joint, together with the contact between the rim strips SR and the double-thicknesses of the rim strips. The connector ring embodiment shown by FIGS. 12 and 20 combines together a stiffening of the mating flanges MF, the provision of a rounded edge RE in the exposed region, a complete hiding of the sharp edge ST and a construction that provides a guide for installing the seal material SR.

FIGS. 14–17 and 21 show a modified form of the invention. In FIGS. 14–17, the mandrel 14' is shown to have an offset forming surface 60'. It includes a radially inner portion 61 and a radially outer portion 63. Portion 63 is offset from portion 61 an amount substantially equal to the thickness of the mating flange. The forming roller 30 presses the workpiece against the offset forming surface 60' such that an offset is formed in the portion of the workpiece that is pushed against the forming surface 60'. FIGS. 15 and 16 show that when the forming tool 44 is moved against the end part 21' of the outer portion of the workpiece 20', the camming surface 62 will fold the end portion 21' down onto the adjoining portion 23' of the workpiece 20 which is the portion that has been offset. When the end part 21 is down flat against part 23', the double-thickness portion of the mating flange is offset on the insertion flange side of the mating flange. The outer surface of part 21, RS is substantially flush with the outer surface of the single thickness inner portion of the mating flange. Forming the offset in the mating flange will further reinforce the mating flange and hence the connector ring as a whole. An advantage of having the double-thickness portion of the mating flange offset from the side of the mating flange opposite the insertion flange as shown by FIG. 12 is that there will in most instances be contact between the double-thickness outer regions of the two mating flanges at a joint. In addition to the advantages previously described, this construction would facilitate maintaining alignment of the duct sections. If there was no contact between the outer regions of the mating flanges, the tightening of the screws s that connect the mating flanges together could pull one of the duct sections DS out of axial alignment with the other. That is, the installer may install a first screw s on one side of the joint and in the process compress the seal ring so as to swing the two mating flanges together at the location of the screws s and at the same time swing apart the portions of the mating flanges at thediametrically opposite location. When all of the screws s are installed, they may compress the seal ring more, and bring the mating flanges closer together, on one side of the ducting than on the other. With a construction that provides contact between the outer regions of the mating flanges, the screws s can be progressively tightened until this contact occurs. Then, they can be tightened an additional amount for making a firm connection at the joint.

Figure 18:
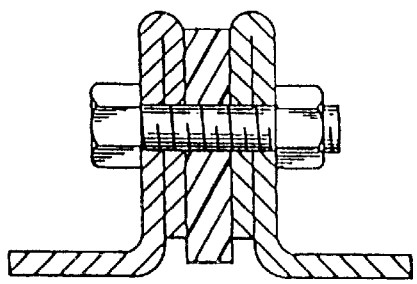
FIG. 18 shows a first form of a SMACNA T-23 connector profile.
Figure 19:
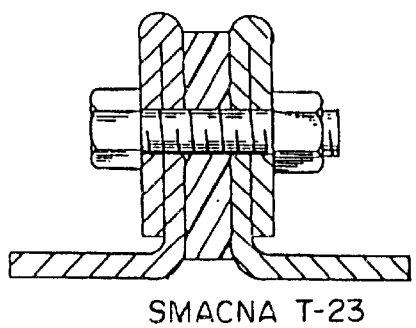
FIG. 19 is a view like FIG. 29, but showing a second form of the T-23 profile.

The SMACNA standards were adapted for rectangular ducting. FIGS. 18 and 19 show two different forms of a SMACNA T-23 connector profile. FIG. 18 shows the folded portion of the mating flange directed towards and contacting the seal ring. FIG. 19 shows the mating flanges folded outwardly rather than inwardly.

FIG. 20 is a longitudinal sectional view of a joint formed by using two connector rings CR of the type shown by FIG. 12.

Figure 21:
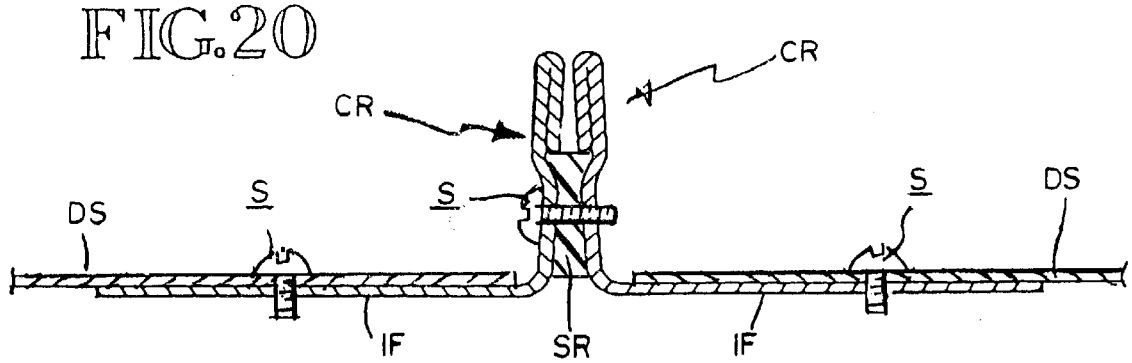
FIG. 21 is a view like FIG. 20 but showing a joint formed by connector rings having the profile shown by FIG. 17.

FIG. 21 is a longitudinal sectional view of the joint showing use of connector rings CR of the type shown by FIG. 17.

Figure 22:
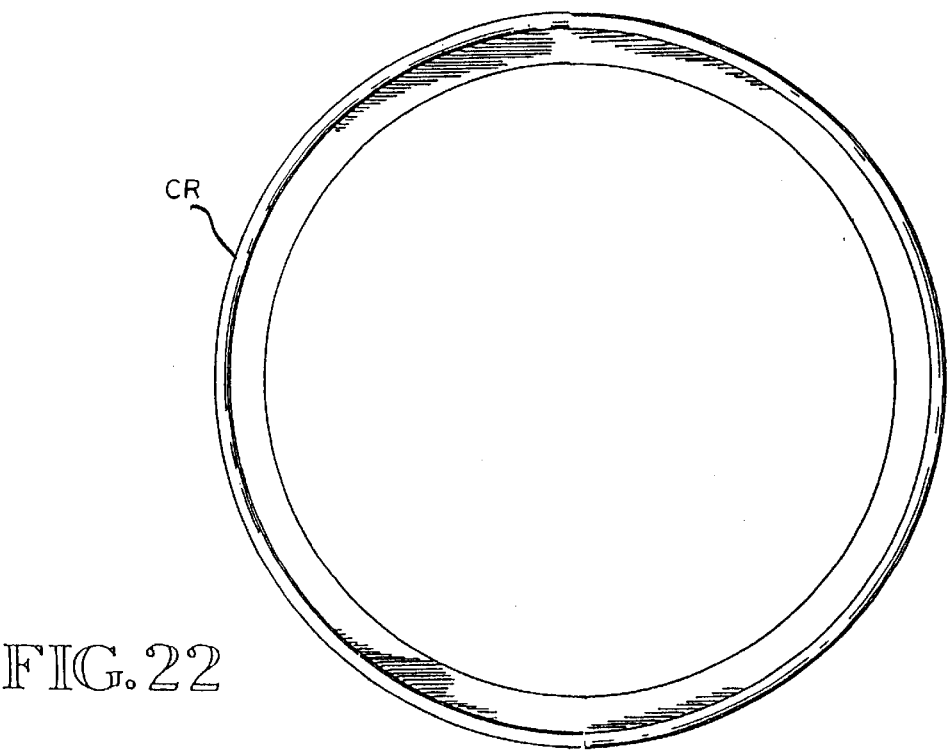
FIG. 22 is an elevational view of a circular connector ring constructed in accordance with the present invention.
Figure 23:
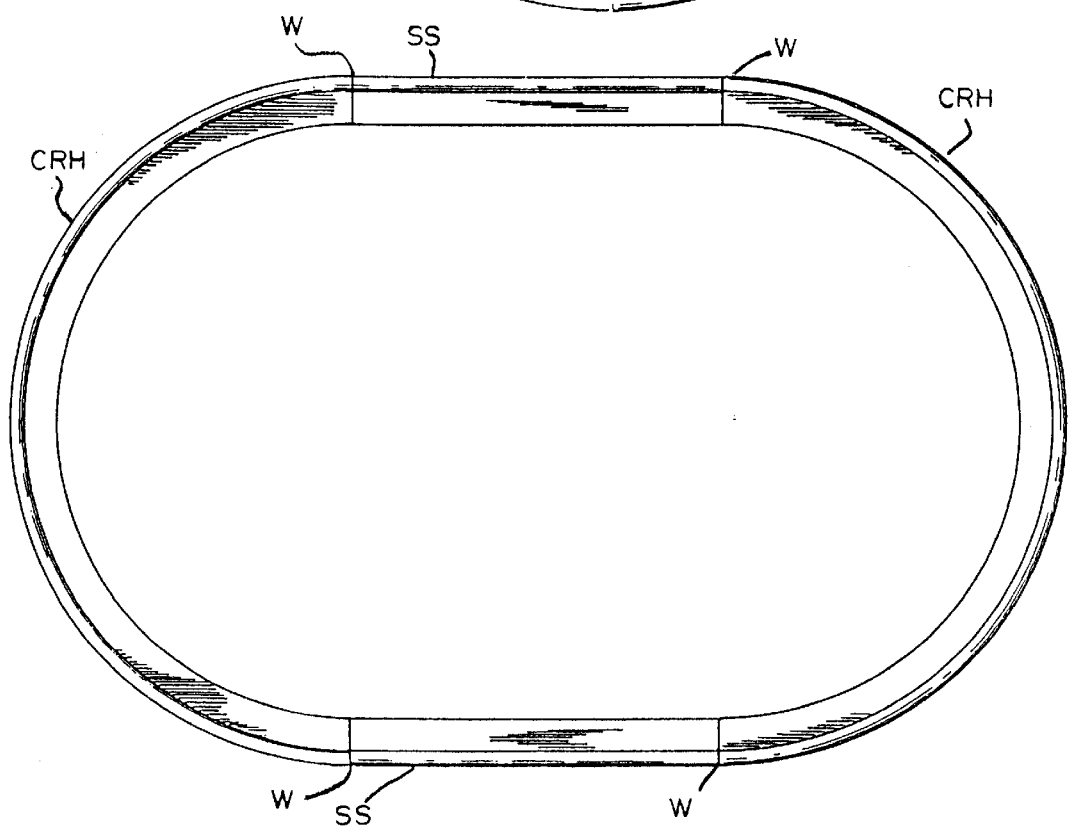
FIG. 23 is an elevational view of an oval connector ring constructed in accordance with the present invention.

The connector rings may be circular CR (FIG. 22) or oval OR (FIG. 23). The oval connector rings OR are made by cutting a circular connector ring CR in half and then placing two straight sections SS between the cut ends of the two halves CRH of the circular rings. The straight sections SS are made to have a profile that matches or is compatible with the profile of the circular connector ring sections, as shown by FIGS. 12 and 17, for example. The straight sections are butt welded at their ends (atw) to the cut ends of the half sections CRH of the circular ring.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A sheet metal connector ring for connecting adjoining ends of two duct sections together or for connecting an end of a duct section to a flat wall surface, comprising:
   a tubular insertion flange sized to be received within an end portion of a section of sheet metal ducting;
   a radial mating flange extending radially outwardly from one end of the insertion flange to an outer edge, said mating flange having an annular, single thickness, inner portion and an annular, double-thickness outer portion; and
   said double-thickness outer portion having a laterally rounded outer edge and an inner edge that is spaced radially inwardly from the outer edge on the side of the mating flange that is opposite the insertion flange, said inner edge-forming an inner boundary-for the double-thickness, outer portion of the mating flange;
   wherein the inner portion of the radial mating flange is a generally radially outwardly extending continuation of the tubular insertion flange and one thickness of the outer portion of the mating flange is a generally radially outwardly extending continuation of the inner portion and the second thickness of the outer portion is a generally radially inwardly extending continuation of the first thickness of the outer portion, and wherein the first thickness of the outer portion of the mating flange is offset axially from the inner portion of the mating flange an amount substantially equal to the thickness of the second portion of the mating flange and the second thickness of the second portion of the mating flange is substantially coplanar with the inner portion of the mating flange.

2. The sheet metal connector ring of claim 1, wherein said connector ring is a circular ring adapted for use with circular ducting.

3. The sheet metal connector ring of claim 1, wherein the connector ring is an oval connector ring and is adapted for use with oval ducting.

4. A connection between adjoining ends of two duct sections, comprising:
   a first duct section having an end portion;
   a second duct section having an end portion;
   a sheet metal connector ring for each duct section, each connector ring comprising:
      a tubular insertion flange sized to be received within an end portion of a section of sheet metal ducting;
      a radial mating flange extending radially outwardly from one end of the insertion flange to an outer edge, said mating flange having an annular, single thickness inner portion and an annular, double-thickness outer portion; and
      said double-thickness outer portion having a laterally rounded outer edge and an inner edge that is spaced radially inwardly from the outer edge on the side of the mating flange that is opposite the insertion flange, said inner edge forming an inner boundary for the double-thickness outer portion of the mating flange;
      wherein the insertion flange of one a first of the connector rings is telescopically received in the end portion of the first duct section and the insertion flange of the second connector ring is telescopically received within the end portion of the second duct section;

wherein the inner portion of each mating flange is a generally radially outwardly extending continuation of the tubular insertion flange and one thickness of the outer portion of the mating flange is a generally radially outwardly extending continuation of the inner portion and the second thickness of the outer portion is a generally radially inward extending continuation of the first thickness of the outer portion;

wherein the first thickness of the outer portion of the mating flange is offset axially from the inner portion of the mating flange is offset axially from the inner portion of the mating flange an amount substantially equal to the thickness of the second portion of the mating flange and the second thickness of the second portion of the mating flange is substantially coplanar with the inner portion of the mating flange;

a seal ring between the mating flanges;

fasteners connecting the end portions of the duct sections to the insertion flanges; and fasteners connecting the mating flanges of the two connector rings together.

5. The connection of claim 4, wherein the connector ring is a circular connector ring adapted for use with circular ducting.

6. The connection of claim 4, wherein the connector ring is an oval connector ring adapted for use with oval ducting.

* * * * *